(12) United States Patent
Saurabh et al.

(10) Patent No.: US 7,532,618 B1
(45) Date of Patent: May 12, 2009

(54) PERFORMING OPERATIONS ON IP TELEPHONY DEVICES FROM A REMOTE CLIENT

(75) Inventors: Prasoon Saurabh, Naperville, IL (US); Anoop Tripathi, Lake Zurich, IL (US); Vikas Vashisht, Naperville, IL (US); Jaideep Abichandani, Carol Stream, IL (US)

(73) Assignee: 3Com Corporation, Marlborough, MA (US)

( * ) Notice: Subject to any disclaimer, the term of this patent is extended or adjusted under 35 U.S.C. 154(b) by 258 days.

(21) Appl. No.: 11/120,445

(22) Filed: May 2, 2005

(51) Int. Cl.
*H04L 12/66* (2006.01)

(52) U.S. Cl. ............... 370/352; 370/356; 370/401; 379/230; 379/227

(58) Field of Classification Search .......... 370/352, 370/356, 401; 709/230, 227
See application file for complete search history.

(56) References Cited

U.S. PATENT DOCUMENTS

| 6,744,759 | B1 | 6/2004 | Sidhu et al. |
| 6,856,616 | B1 | 2/2005 | Schuster et al. |
| 6,992,974 | B1 * | 1/2006 | Tripathi ............ 370/216 |
| 7,010,608 | B2 * | 3/2006 | Garg et al. ........... 709/229 |
| 7,142,648 | B1 * | 11/2006 | Miller ............... 379/88.23 |
| 7,161,932 | B1 * | 1/2007 | Watts ................. 370/352 |
| 2005/0157731 | A1 * | 7/2005 | Peters ................ 370/401 |
| 2006/0062205 | A1 * | 3/2006 | Doherty et al. ........ 370/352 |

OTHER PUBLICATIONS

H. Schulzrinne, S. Casner, R. Frederick, V. Jacobson, Internet Engineering Task Force, ("IETF"), Request for Comments ("RFC") RFC-1889, "RTP: A Transport Protocol for Real-Time Applications", Jan. 1996, Entire document.

H. Schulzrinne, A. Rao, R. Lanphier, Internet Engineering Task Force, ("IETF"), Request for Comments ("RFC") RFC-2326, "Real Time Streaming Protocol (RTSP)", Apr. 1998, Entire document.

M. Arango, A. Dugan, I. Elliott, C. Huitema, S. Pickett, Internet Engineering Task Force, ("IETF"), Request for Comments ("RFC") RFC-2705, "Media Gateway Control Protocol (MGCP)", Oct. 1999, Entire document.

F. Cuervo, N. Greene, A. Rayhan, C. Huitema, B. Rosen, J. Segers, Internet Engineering Task Force, ("IETF"), Request for Comments ("RFC") RFC-3015, "Megaco Protocol Version 1.0", Nov. 2000, Entire document.

(Continued)

*Primary Examiner*—Sanh D Phu
(74) *Attorney, Agent, or Firm*—McDonnell Boehnen Hulbert & Berghoff (57) ABSTRACT

A method and system for remotely accessing an intelligent IP telephony device is provided. Information about at least one IP telephony device associated with a user is stored in a database. The database is accessible to a user through a secured environment. From a remote location, the user may logon to the database and select one or more actions to be performed on any of the IP telephony devices to which they have access.

20 Claims, 4 Drawing Sheets

OTHER PUBLICATIONS

J. Rosenberg, H. Schulzrinne, G. Camarillo, A. Johnston, J. Peterson, R. Sparks, M. Handley, E. Schooler, Internet Engineering Task Force, ("IETF"), Request for Comments ("RFC") RFC-3261, "SIP: Session Initiation Protocol", Jun. 2002, Entire document.

J. Rosenberg, H. Schulzrinne, ("IETF"), Request for Comments ("RFC") RFC-3262, "Reliability of Provisional Responses in the Session Initiation Protocol (SIP)", Jun. 2002, Entire document.

J. Rosenberg, H. Schulzrinne, ("IETF"), Request for Comments ("RFC") RFC-3263, "Session Initiation Protocol (SIP): Locating SIP Servers", Jun. 2002, Entire document.

J. Rosenberg, H. Schulzrinne, ("IETF"), Request for Comments ("RFC") RFC-3264, "An Offer/Answer Model with the Session Description Protocol (SDP)", Jun. 2002, Entire document.

A. B. Roach, ("IETF"), Request for Comments ("RFC") RFC-3265, "Session Initiation Protocol (SIP)-Specific Event Notification", Jun. 2002, Entire document.

O. Levin, ("IETF"), Request for Comments ("RFC") RFC-3508, "H.323 Uniform Resource Locator (URL) Scheme Registration", Apr. 2003, Entire document.

* cited by examiner

PERFORMING OPERATIONS ON IP TELEPHONY DEVICES FROM A REMOTE CLIENT

FIELD

The present application relates to network telephony services and, more particularly, to a method and system for remote management of an IP telephony device (e.g., a SIP phone) via a secure interface.

BACKGROUND

Internet protocol ("IP") telephony and IP multimedia networks employ several protocols to setup and manage calls and sessions. One of the most widely adopted protocols for IP-based signaling is Session Initiation Protocol ("SIP"). SIP is used, for example, for initiating new calls and sessions, manipulating call paths, and enabling the association of services with users regardless of their point of connection in the network. These are just a few areas of SIP application.

The increasing use of SIP has spurred development and introduction of numerous services with SIP interfaces for the user and network access. This approach makes sense, as the number of SIP-capable devices proliferates in IP networks. These devices have several features and mechanisms defined to employ existing telephony features in SIP.

One such feature is the ability to access individual account information and/or services associated with various users or their IP telephony devices. For instance, in one type of IP telephony system, each individual user's account information and associated services are collectively stored on a central server that can be accessed remotely via an interface program, such as a web browser. Since the account information and services are centrally stored on a server, the user device used in this type of IP telephony system is typically not "intelligent," in that the user device itself does not store user account information or services.

In another type of IP telephony system, an intelligent user device, such as a SIP phone, may be used. The "intelligence" of this user device enables it to store individual account information and/or services associated with a registered user. A user may "log on" to the device to become a registered user and access such account information and/or services, or the user may "log off" to de-register the device. In order to log on or off such an intelligent user device e.g., (a SIP phone), and to access account information/services associated with the device, a user must be physically present together with the device. In other words, intelligent user devices, such as SIP phones, cannot be remotely managed or controlled. This arrangement can be problematic, since a user may want to manage or control several different user devices that are not in the same physical location as the user.

Accordingly, it would be desirable to have a system and method for remotely managing intelligent IP telephony devices, such as SIP phones.

SUMMARY

In an exemplary embodiment, a method for remotely accessing an IP telephony device is provided. The method includes providing one or more IP telephony devices in communication with a connection server, gathering information about at least one IP telephony device associated with a user, storing the information in a database in communication with the connection server, allowing a user to access the database in a secured environment, and allowing the user to select one or more actions to be performed on any of the one or more IP telephony devices in the database.

A system for remotely accessing an IP telephony device is also disclosed. The system includes one or more IP telephony devices, a connection server in communication with a database for storing user information about the one or more IP telephony devices, and a remote client for allowing a user to access the database. The user may take one or more actions on any of the one or more IP telephony devices via a secure connection between the remote client and the connection server.

DETAILED DESCRIPTION OF EXEMPLARY EMBODIMENTS

Exemplary Network Arrangement

Figure 1:
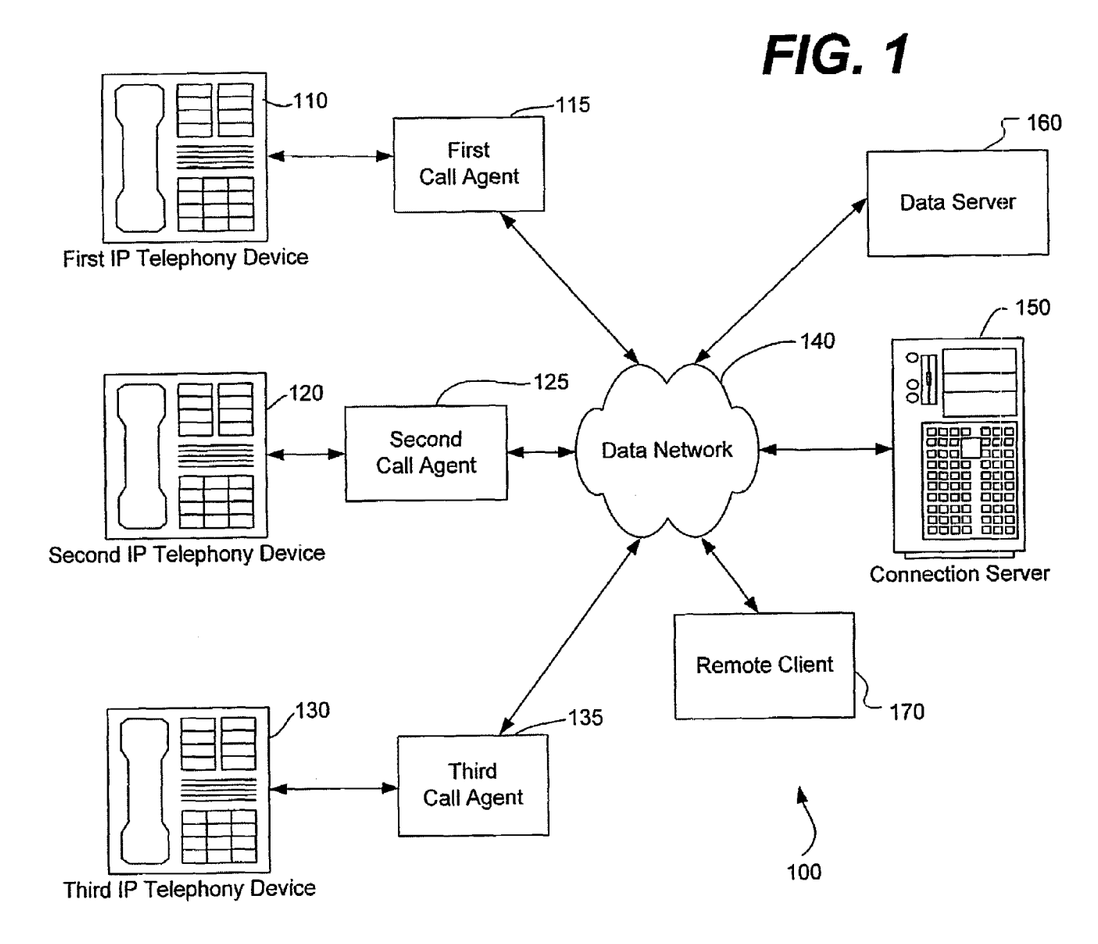
FIG. 1 is a block diagram illustrating one exemplary embodiment of a network telephony system according to the present application.

Referring to the drawings, FIG. 1 is a block diagram illustrating an exemplary network telephony system, such as an IP telephony communication system 100, in which an exemplary embodiment of the present application can be employed. It should be understood, however, that this and other arrangements described herein are set forth for purposes of example only. As such, those skilled in the art will appreciate that other arrangements and other elements can be used instead, and some elements may be omitted altogether. For example, as explained in more detail below, it should be understood that while call agents are shown in FIG. 1, the IP telephony communication system 100 of the present application does not require the presence of such call agents, and communication may be established between the telephony devices and the connection server directly via the data network.

In one exemplary embodiment, a signaling protocol used in the IP telephony communication system 100 may be the Session Initiation Protocol ("SIP") signaling protocol. Other signaling protocols, such as H.323, Media Gateway Control Protocol ("MGCP"), Media Gateway Control Protocol ("MEGACO"), and other standard or proprietary techniques may alternatively be used. Internet Engineering Task Force ("IETF") Requests For Comments ("RFC") 3508 that describes H.323 protocol, RFC 2705 that describes MGCP, and RFC 3015 that describes MEGACO are each entirely incorporated by reference herein, as if fully set forth in this description.

Before describing the exemplary embodiment of the telephony network shown in FIG. 1, a brief overview of SIP will be described herein. For a more detailed description of SIP, reference may be made to IETF RFCs 3261, 3262, 3263, 3264, and 3265, all of which are specifically incorporated in their entirety herein by reference.

SIP Overview

SIP describes how to set up Internet telephone calls, videoconferences, and other multimedia connections. SIP can establish two-party sessions (ordinary telephone calls), multiparty sessions (where everyone can hear and speak), and multicast sessions (one sender, many receivers). The sessions may contain audio, video, or data. SIP handles call setup, call management, and call termination and may use other protocols to do so, such as Real Time Protocol ("RTP") for transporting real-time data and providing Quality of Service ("QoS") feedback, and the Real-Time Streaming Protocol ("RTSP") for controlling delivery of streaming media. IETF RFC 1889 that describes RTP and IETF RFC 2326 that describes RTSP are both entirely incorporated by reference herein, as if fully set forth in this description. SIP is an application layer protocol that may run over the user datagram protocol ("UDP") or the transport control protocol ("TCP"), for example.

SIP supports a variety of services, including locating a callee, determining the callee's capabilities, and handling the mechanics of call setup and termination, for example. SIP defines telephone numbers as uniform resource locators ("URLs"), so that Web pages can contain them, allowing a click on a link to initiate a telephone call (similar to the mailto function that allows a click on a link to initiate a program to send an e-mail message). For example, John_Doe@3Com.com may represent a user named John at the host specified by the domain name system ("DNS") of 3Com. SIP URLs may also contain other addresses or actual telephone numbers.

The SIP protocol is a text-based protocol in which one party sends a message in American standard code for information interchange ("ASCII") text consisting of a method name on the first line, followed by additional lines containing headers for passing parameters. Many of the headers are taken from multipurpose Internet mail extensions ("MIME") to allow SIP to interwork with existing Internet applications.

As an example, consider the following exemplary text encoded message.

```
INVITE sip:user@biloxi.com SIP/2.0
Via: SIP/2.0/UDP pc33.atlanta.com;branch=z9hG4bK776asdhds
Max-Forwards: 70
To: User <sip:user@biloxi.com>
From: Sender <sip:sender@atlanta.com>;tag=1928301774
Call ID : a84b4c76e66710@pc33.atlanta.com
CSeq: 314159 INVITE
Contact: <sip: sender@pc33.atlanta.com>
Content-Type: application/sdp
Content-Length: 142
```

The first line of this text-encoded message contains the method name (e.g., INVITE). The lines that follow are a list of header fields. For example, the header fields are "Via" (describing the address at which the user is expecting to receive responses), "To" (contains a display name or SIP request-URI towards which the request was originally directed), "From" (contains a display name and a SIP request-URI that indicate the originator of the request), "Call ID" (contains a globally unique identifier for this call), CSeq (a traditional sequence number), "Contact" (contains a SIP request-URI that represents a direct route to contact the sender), and "Content-Type" (information about the type of session that should be established, e.g., the Session Description Protocol ("SDP"), which describes parameters like type of media streams). In addition, the "From" header also has a tag parameter containing a random string (e.g., 1928301774) that is used for identification purposes.

Other example methods are provided below in Table 1.

TABLE

| METHOD | DESCRIPTION |
|---|---|
| INVITE | Request initiation of a session |
| ACK | Confirm that a session has been initiated |
| BYE | Request termination of a session |
| OPTIONS | Query a host about its capabilities |
| CANCEL | Cancel a pending request |
| REGISTER | Inform a redirection server about the users current location |
| NOTIFY | Indicates the status of a request |
| REFER | Requests that the party sending the REFER be notified of the outcome of the referenced request |

To establish a call session between two or more user agents (which include, and may also be referred to herein as, "user devices," "SIP devices," or "SIP phones"), one user agent would send to another an INVITE message. The transmission of the INVITE message may use TCP or UDP protocol, for example. In either case, the headers on the second and subsequent lines of INVITE message describe the structure of the message body, which contains the calling user agent's capabilities, media types, and formats. The INVITE message also contains a user identifier to identify the called user agent, a user identifier to identify the calling user agent, and a session description that informs the called user agent what type of media the calling user agent can accept and where the calling user agent wishes the media to be sent. User agent identifiers in SIP requests are known as SIP addresses. SIP addresses are referred to as Universal Resource Indicators (SIP request-URIs), which are of the form sip:user@host.domain. Other addressing conventions may also be used.

Upon receiving the INVITE request, the called user agent may transmit a response message ACK to the calling user agent, and if the called user agent accepts the call, the called user agent will respond with a 200 OK message. Following the reply code line, the called user agent may also supply information about its capabilities, media types and formats.

If the transmitted response message is a success, the calling user agent may send an ACK message back to the called user agent to confirm receipt of the 200 OK message and complete the call initiation process. After the call has been initiated using the SIP signaling protocol, the call is connected and media data (including voice information, etc.) can flow on a data channel between the user agents and through an access and a data network.

Other methods described in Table 1 can be used throughout the call session. For example, either party may request termination of a session by sending a message containing the BYE method. When the other side acknowledges the BYE method, the session is terminated.

Similarly, either party may send information by sending a message containing the NOTIFY method. The NOTIFY method informs the party of the status of a request or a change of service state. For instance, the NOTIFY method may be used to log on or off a SIP device, lock or unlock a SIP device, or activate or de-activate a service subscribed to by a user on a SIP device. The NOTIFY method may also be challenged if a user enters an invalid username and password when attempting to logon to the system.

As another example, the OPTIONS method may also be used to query a user agent about its own capabilities. The OPTIONS method is typically used before a session is initiated to determine if that the user agent is even capable of SIP or whatever type of session is being contemplated.

Furthermore, the REGISTER method relates to SIP's ability to track down and connect to a user whose location may not be associated with a single, fixed phone or client device. This message is sent to a SIP location server to inform the location server of who is where. That server can later be queried to find a user's current location. User agents have pre-programmed device identifiers (e.g. phone numbers), represented as SIP request-URI's that are of the form sip: user@domain. An example is sip: 1234567890@sample.com. After power-up, each of the user agents may send a SIP REGISTER message to the default registrar to inform the registrar of the user agents' address and location.

When a call arrives at the proxy server for any of the registered SIP request-URIs, a server will forward the call to the appropriate destination. If a network phone is moved to a new location, all calls to the associated SIP request-URI will still be properly routed to that device. Alternatively, if a user moves to a different phone, that user may inform the server of the location of the new phone, so that the user's SIP request-URI may be mapped to that new phone. In other words, a SIP system can provide device mobility since calls will "follow" the network phone or the user according to the network phone's or user's SIP request-URI. This is useful if network phones run the Dynamic Host Configuration Protocol ("DHCP") so that when the location is changed, the IP address is also automatically changed.

IP Telephony Communication System 100

As illustrated in FIG. 1, the exemplary IP telephony communication system 100 includes a first IP telephony device 110, a second IP telephony device 120, and a third IP telephony device 130 each positioned at different remote locations, and all connected to a connection server 150 via a data network 140. Preferably, each of the IP telephony devices 110, 120, 130 is an intelligent device that contains and stores user account information and services associated with a user. In one exemplary embodiment, one or all of the IP telephony devices 110, 120, and 130 are SIP-based network phones, each being associated with a call agent 115, 125, and 135, respectively.

The call agents 115, 125, and 135 may be comprised of software, hardware, or any combination of both software and hardware. The call agents 115, 125, and 135 may also be unified into a single call agent that services all three of the IP telephony devices 110, 120, and 130. Moreover, these call agents may be separate from their respective IP telephony devices, or alternatively, may be integrated with their respective IP telephony devices. In addition, as previously mentioned, the call agents, while preferable, are not required in the IP telephony communication system 100, and communication between the IP telephony devices 110, 120, and 130 and the connection server 150 may take place directly via the data network 140.

The call agents 115, 125, and 135 may receive an action to be performed on an IP telephony device by a user or network administrator, and notify the IP telephony device of the action to be performed. Although the IP telephony devices 110, 120, and 130 are shown as network phones, other implementations may also be used. For example, the IP telephony devices 110, 120, and 130 may be any other IP telephony devices, such as personal digital assistants (PDAs), personal computers with software to perform SIP functions, and user interface hardware, such as a microphone and a headphone to communicate voice information. Other user interfaces, such as video and/or other types of data communication, may also be used, whether the devices use wired or wireless communication techniques. In addition, more IP telephony devices may be included in the IP telephony communication system 100 than those shown in FIG. 1.

The IP telephony devices 110, 120, and 130 may receive calls from each other or from devices on other types of communication networks, such as from telephones located on the Plain Old Telephone System ("POTS") or on the Public Switched Telephone Network ("PSTN"), when appropriate gateways (not shown) are implemented in the IP telephony communication system 100.

The data network 140 may be a public Internet or other transport networks, such as Wide Area Networks ("WAN") and Local Area Networks ("LAN"). As shown in FIG. 1, the data network 140 connects call agents 115, 125, and 135, as well and their respective IP telephony devices 110, 120, and 130, to the connection server 150. The connection server 150 preferably has a registry for IP telephony numbers, a validation function, a logic component for sending messages to, and receiving messages from, IP telephony devices (e.g., IP telephony devices 110, 120, and 130), and one or more web pages for displaying IP telephony device information to a remote client 170, and for providing an interface between the remote client 170 and the IP telephony devices 110, 120, and 130. The connection server 150 may also provide other functions, such as authentication of IP telephony devices 110, 120, 130. Also, the connection server 150 may provide network access control, routing, reliable request transmission and retransmission, and security. As one example, the connection server 150 may be a SIP proxy server.

As shown in FIG. 1, the connection server 150 preferably has access to a data server 160 through the data network 140. Although the data server 160 is shown as a separate device, the data server may also be integrated with the connection server 150 into a single device. The data server 160 performs authentication, authorization, and routing services to the network. The data server 160 contains a list of the IP telephony devices (e.g., IP telephony devices 110, 120, and 130) that users in the system 100 are authorized to access. The data server 160 also contains a list of the IP telephony devices that are currently being accessed by each user. The data server 160 may store such user information in either a local database or a remote database in communication with the data server via the data network 140.

The connection server 150 may be accessible to a remote client 170 over the data network 140 if the remote client 170 is authenticated. As stated earlier, the data network 140 may be a public Internet. Although not shown, it should be understood that the remote client 170 may access the connection server 150 via a network different than the data network 140. For instance, if the data network 140 were a WAN or LAN network, the remote client 170 may remotely access the connection server 150 via the Internet instead of the WAN or LAN network.

The remote client 170 preferably comprises a personal or handheld computer with a web browser that is capable of interfacing with the connection server 150. As explained in more detail below, the remote client 170 allows users with accounts on the system 100 to login to the connection server 150 and remotely access their accounts and/or services via the remote client's web browser. This arrangement permits a user to change the status of an IP telephony device (e.g., log on or off an IP telephony device, lock or unlock an IP telephony device, etc.), or enable and disable certain services/features on their IP telephony devices from a remote location.

Figure 2:
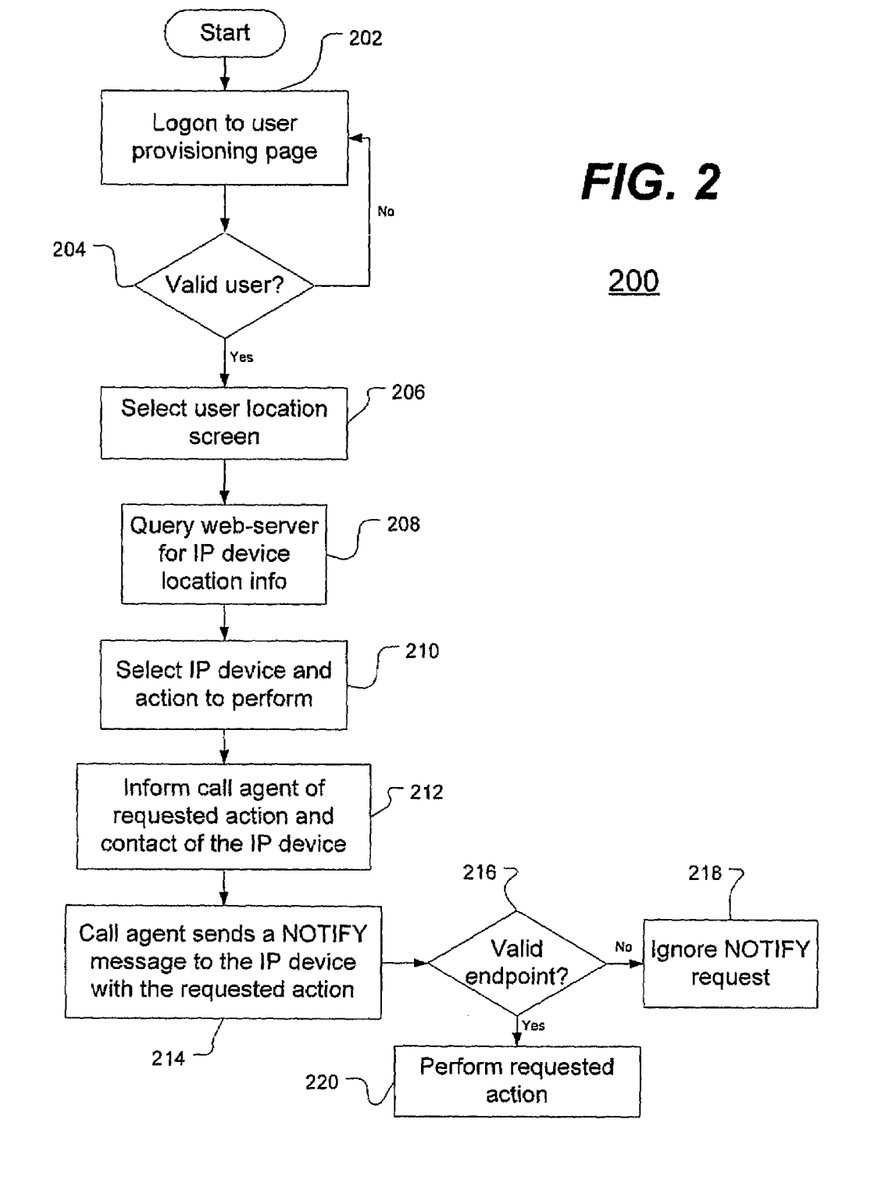
FIG. 2 is a flow chart depicting one embodiment of a method of granting a user access to a connection server to perform functions on an IP telephony device used in the system of FIG. 1.

Method for Remotely Accessing and Controlling an Intelligent IP Telephony Device FIG. 2 is a flow chart 200 depicting one embodiment of a method for remotely accessing and controlling an intelligent IP telephony device, such as a SIP phone. As shown in FIG. 2, to access information about a user's account and services, as well as the user's associated IP telephony devices, a user first logs on to the connection server 150 via the web browser of the remote client 170, in step 202. Preferably, this is a secure connection between the remote client 170 and the connection server 150, and a proper username (or user ID) and password combination must be supplied by the user in order to connect with and access the connection server 150. As shown in step 204, a determination may be made as to whether or not the user is a valid user by checking the validity of the username/ user ID and password combination supplied by the user, and comparing the combination with authorization information stored in the data server 160 (or the connection server 150). If the user is not a valid user, then the method 200 returns to step 202.

Figure 3:
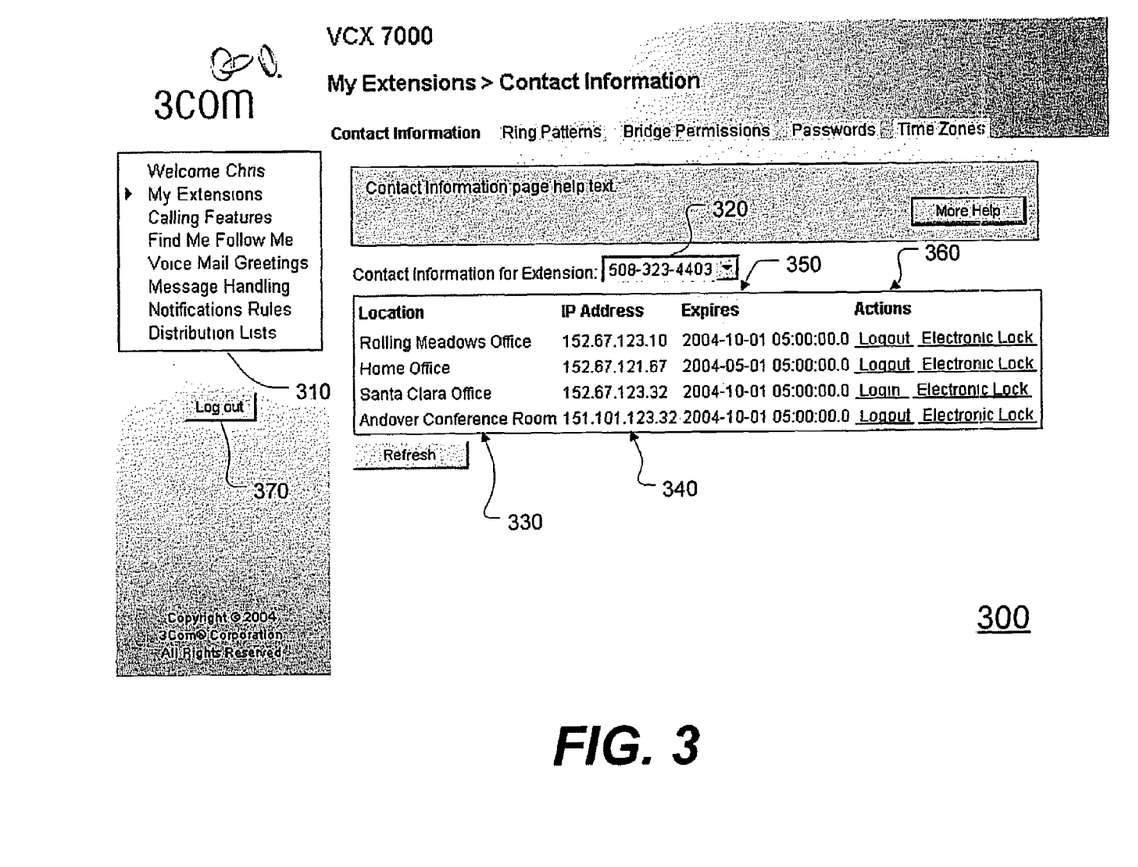
FIG. 3 is an exemplary interface screen that may be presented to a user after logging on to the connection server of the system of FIG. 1.

If the user is a valid user, however, then the method 200 continues with step 206. In step 206, a user (remote client 170) is granted access to the connection server 150 and selects a "user location" screen via a link displayed in its web browser. An exemplary "user location" screen is shown in FIG. 3, and will be described in more detail below. It should be understood that reference to a "screen" in this application is the same as a reference to a displayed web page, and vise-versa.

In order to provide the content of the "user location" screen, the connection server must be queried for information relating to the IP telephony devices associated with the user, as shown in step 208. To accomplish this step, the connection server 150 may in turn query the data server 160 for the information regarding the associated IP telephony devices, particularly information regarding the status and location of each IP telephony device associated with the user.

As shown in step 210, once a user has been presented with a populated "user location" screen, the user may then select a particular IP telephony device and an action to perform on that device. Actions available to a user may include logging onto or logging out of the IP telephony device, electronically unlocking or locking the device, remotely booting the device, enabling or disabling certain services/features on the device, or any other remote management action. For a user that is a network administrator, the actions may further include a forced logoff of a user, forced remote booting of the device, and electronically unlocking or locking the device, for example.

Once an IP telephony device and action is selected in step 210, the call agent (e.g., call agent 115) associated with the selected IP telephony device (e.g., IP telephony device 110) is informed of the requested action by the user in step 212. The call agent then, in step 214, sends a NOTIFY message to the IP telephony device with the requested action. Next, as shown in step 216, a determination is made as to whether or not the NOTIFY message is valid for the receiving IP telephony device. User authorization information, such as usernames, passwords, and actions available for each user, is preferably stored in each individual IP telephony device (which is preferably an "intelligent" device). If the NOTIFY message is invalid, i.e., if the user is not authorized to perform the requested action on the chosen IP telephony device, then the NOTIFY message request is ignored at step 218. If, however, the NOTIFY message is valid, i.e., if the user is authorized to perform the action, then the requested action is performed on the chosen IP telephony device in step 220.

FIG. 3 illustrates an exemplary "user location" screen (or web page) 300 available to the user once he or she has validly logged onto the connection server 150 with his or her remote client 170. Information about the current status of each IP telephony device to which the user has access (e.g., IP telephony devices 110, 120, and 130) may be found in the "My Extensions" link from menu 310. By selecting this link, the web browser of the remote client 170 displays the "user location" screen 300, wherein the user may view the location 330 and the IP address 340 of each IP telephony device associated with that user. These IP telephony devices include the user's known locations (e.g., offices), as well as any other locations that the user is logged into. In addition, the user may also view the date and time of expiration 350 for each such location. The date and time of expiration 350 will update automatically until the user logs out of that IP telephony device. Finally, a user may view a list of actions 360 that the user may perform on each IP telephony device.

One or more actions 360 may be selected for any particular IP telephony device. These actions include, for example, login, logout, and electronic lock, as shown in FIG. 3. Other actions may include remote boot, enabling or disabling certain services/features, such as a stock ticker or long distance access, and forced logoff in the case that the user is a network administrator. Each action 360 is displayed as a link so the user may simply click on the link to initiate performance of the action. When the user is finished selecting actions to be performed on the IP telephony devices, he or she may choose another item from the menu 310 to access other functions related to the IP telephony communication system 100, or he or she may logout of the remote client's web browser connection with the connection server by clicking the logout button 370.

In the case that the user is a network administrator, he or she may have full access to all of the locations and IP telephony devices on the system. Consequently, if a user is unavailable, the network administrator may access the user's information and perform actions on their IP telephony devices remotely via the remote client 170.

Method for Remotely Accessing and Controlling a SIP Device

Figure 4:
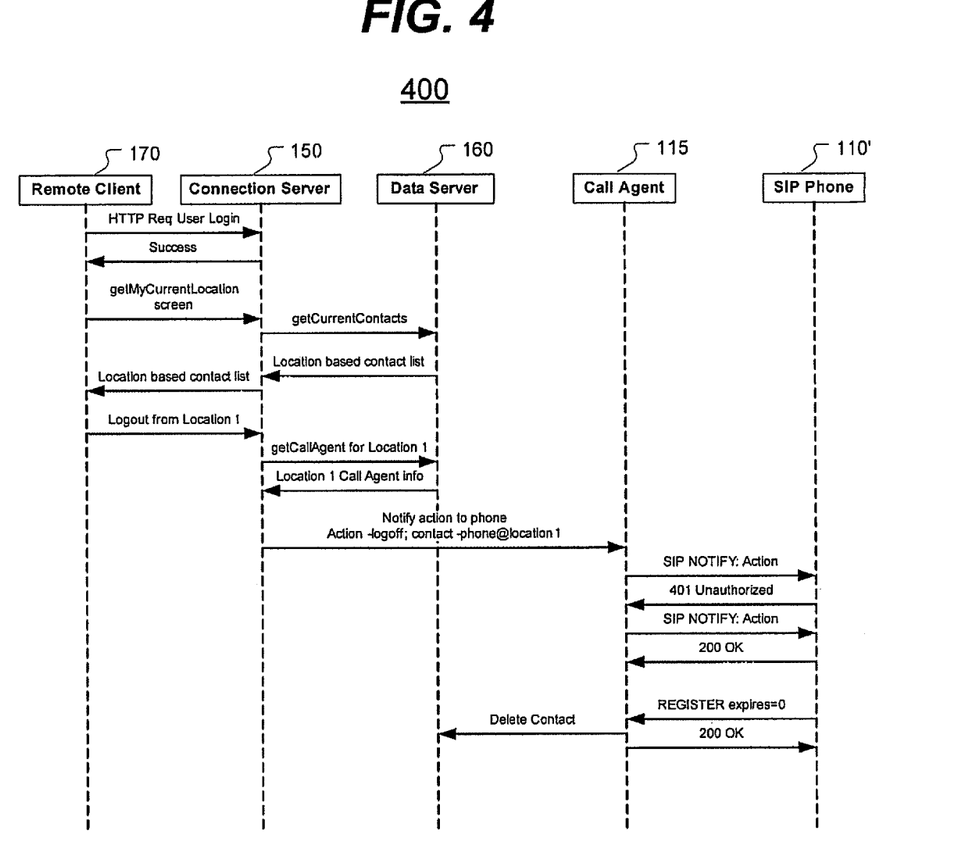
FIG. 4 is a message flow diagram illustrating one example of remotely accessing a SIP device within the network telephony system of FIG. 1.

FIG. 4 is a message flow diagram 400 illustrating one example of remotely accessing and controlling a SIP phone 110'. The SIP signaling within FIG. 4 may be used to carry out the method depicted in FIG. 2, for example. FIG. 4 illustrates exemplary message flow between the remote client 170 (user), the connection server 150, the data server 160, the call agent 115, and its respective IP telephony device 110, which in this example, is a SIP-based network phone 110. Although the example in FIG. 4 is illustrated using SIP, other protocols may also be used, such as the H.323 call control protocol. Also, for the example illustrated in FIG. 4, it should be understood that the connection server 150 is preferably a SIP proxy server. In addition, for the example illustrated in FIG. 4, Hypertext Transfer Protocol ("HTTP") is used as the communication protocol between the remote client 170 and the connection server 150; however, it should be understood that other communications protocols may be used instead.

In the example illustrated in FIG. 4, the remote client 170 initiates a communication session with the connection server 150 by sending a request for a user login ("HTTP Req: User Login") to the connection server 150. If the user is authorized (i.e., valid), the connection server 150 then sends a "success" message to the remote client 170 in return. Once the user is logged in, the remote client 170 sends a message to the connection server 150 requesting the current location screen of the user ("getMyCurrentLocationscreen").

The connection server 150 then sends a message to the data server 160 requesting the current SIP phones locations, also referred to as contacts, accessible by the user ("getCurrent-Contacts"). The data server 160 then responds back to the connection server 150 with the location of the SIP phones ("Location based contact list"), and the connection server 150 relays the information to the remote client 170.

Next, the user (remote client 170) then selects an action to be performed at one of the SIP phone locations provided by the connection server 150. In this example, the user has selected to logout of the SIP phone 110' ("Logout from Location 1"). In FIG. 4, a logout request is shown, but other types of actions may also be performed including electronic lock and remote boot, for example.

Once the request for the action has been established by the user, the connection server 150 locates a call agent for the SIP phone 110' (i.e., SIP phone) that the user selected for the action (e.g., logout) from the data server 160 ("getCallAgent for Location 1"). For purposes of this example, the call agent 115 is the call agent associated with the SIP phone 110'. The data server 160 then responds to the connection server 150 with the location of the call agent 115 ("Location 1 Call Agent info").

Now that the connection server 150 has the location of the call agent 115 for the SIP phone 110', the connection server sends a NOTIFY method (message) notifying the call agent 115 of the action requested by the user ("Notify action to phone; Action—logoff; contact—phone@locationl"). The call agent 115, using SIP signaling, then notifies the SIP phone 110' of the action (logout) to be performed ("SIP NOTIFY: Action"). If the user is authorized to perform the action, the SIP phone 110' may respond to the call agent 115 with a 200 OK acknowledgement (ACK) message, in which case the action (logout) is performed on the SIP phone 110'. The SIP phone 110' may respond with a 401 unauthorized message, however, if the user is not authorized to perform that action, such as an action reserved for only a network administer, including forced logoff, for example. In that case, the remote client 170 (user) is informed that the action cannot be performed.

After the action has been performed, the SIP phone 110' sends a message to the call agent 115 indicating that the SIP phone 110' is logged out ("REGISTER expires=0"). Next, based on the SIP phone 110' now being logged out, the call agent 115 may delete the location or contact for the SIP phone 110' from the data server 160 ("Delete Contact"). The call agent 115 may then also send a 200 OK message to the SIP phone 110' acknowledging the logout and the action being performed by the SIP phone 110'.

The application provides several advantages over the prior art. For instance, the present application provides a secure and easy way for a user to access their account information/services, and remotely manage their associated IP telephony devices from various locations. Therefore, for example, if a user has forgotten to manually perform a function on an intelligent IP telephony device (e.g., a SIP phone), there is no need to physically go to the device's location to perform the function. Another advantage of this application is that it provides the network administrator with the ability to remotely perform functions on any intelligent IP telephony device in their system, such as in the case where the user is unable to perform the function themselves for any reason.

While exemplary embodiments have been described, persons of skill in the art will appreciate that variations may be made without departure from the scope and spirit of the invention. The true scope and spirit of the invention is defined by the appended claims, which may be interpreted in light of the foregoing.

We claim:

1. A method for remotely accessing and controlling an IP telephony endpoint device, the method comprising:
    providing one or more IP telephony endpoint devices in communication with a connection server;
    storing on the one or more IP telephony endpoint devices account information and remote management actions available for registered users;
    allowing a user to remotely access the connection server in a secured environment;
    gathering status information about at least one IP telephony endpoint device associated with the user from the at least one IP telephony endpoint device; providing a user interface for allowing the user to view the status information about the at least one IP telephony endpoint device, the user interface also including one or more remote management actions to be performed on the at least one IP telephony endpoint device; presenting the user interface to the user via the connection server;
    allowing the user to select one or more remote management actions to be performed on the at least one IP telephony endpoint device associated with the user; and
    performing the one or more selected remote management actions on the at least one IP telephony endpoint device.

2. The method of claim 1 wherein two or more IP telephony endpoint devices are intelligent devices positioned at different remote locations.

3. The method of claim 1 wherein the remote management actions comprise at least one of remote logoff, remote logon, remote boot, and electronic lock.

4. The method of claim 1 wherein the user is a network administrator.

5. The method of claim 4 wherein the remote management actions comprise at least one of forced logoff, forced remote boot, and electronic lock.

6. The method of claim 1 further comprising notifying the IP telephony endpoint devices of the one or more remote management actions selected by the user via the connection server through a Session Initiation Protocol (SIP).

7. The method of claim 1 further comprising notifying the at least one IP telephony endpoint device of the selected remote management action via a call agent.

8. The method of claim 1 wherein the IP telephony endpoint devices comprise at least one of a network phone, a mobile phone, a personal digital assistant, or a computer.

9. The method of claim 1 wherein the remote management actions comprise enabling or disabling features or services on the IP telephony endpoint devices.

10. A method for remotely accessing a SIP endpoint device, the method comprising:
    providing one or more SIP endpoint devices positioned at different remote locations in communication with a connection server using a SIP protocol, each SIP endpoint device storing account information and remote management actions available for registered users;
    allowing a user to remotely access the connection server through a secure web browser;
    gathering status information about at least one SIP endpoint device associated with the user from the at least one SIP endpoint device; providing a user interface for allowing the user to view the status information about the at least one IP telephony endpoint device, the user interface also including one or more remote management actions to be performed on the at least one IP telephony endpoint device; presenting the user interface to the user via the connection server;

allowing the user to select one or more remote management actions to be performed on the at least one SIP endpoint device associated with the user;

notifying the at least one SIP endpoint device of the selected one or more remote management actions via a call agent associated with the SIP endpoint device; and performing the selected one or more remote management actions on the at least one SIP endpoint device.

11. The method of claim 10 wherein the user is a network administrator.

12. The method of claim 10 wherein the remote management actions comprise at least one of remote logoff, remote logon, remote boot, and electronic lock.

13. The method of claim 10 wherein the SIP endpoint device comprises at least one of a network phone, a mobile phone, a personal digital assistant, or a computer.

14. The method of claim 11 wherein the remote management actions comprise at least one of forced logoff, forced remote boot, and electronic lock.

15. The method of claim 10 wherein the remote management actions comprise enabling or disabling features or services on the SIP endpoint device.

16. A system for remotely accessing an IP telephony endpoint device comprising:

one or more IP telephony endpoint devices having account information and remote management actions available for registered users stored on the devices;

a connection server in communication with one or more IP telephony endpoint devices, the connection server providing a user interface for allowing the user to view the status information about the at least one IP telephony endpoint device, the user interface also including one or more remote management actions to be performed on the at least one IP telephony endpoint device; and a remote client for allowing a user to access the connection server;

wherein the user may take one or more remote management actions on any of the one or more IP telephony endpoint devices via a secure connection between the remote client and the connection server.

17. The system of claim 16 wherein at least two IP telephony endpoint devices are intelligent devices positioned at different remote locations.

18. The system of claim 16 wherein the secure connection is through a web browser.

19. The system of claim 16 wherein the connection server communicates with a call agent, and wherein the call agent notifies the IP telephony endpoint devices of the one or more remote management actions taken by the user through a SIP protocol.

20. The system of claim 16 wherein the remote management actions comprise at least one of remote logoff, remote logon, remote boot, and electronic lock.

* * * * *